Patented Oct. 16, 1951

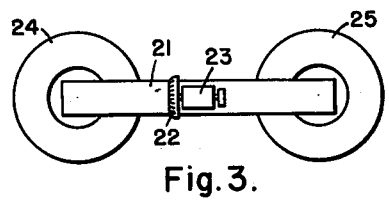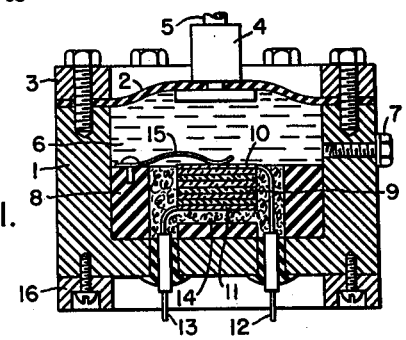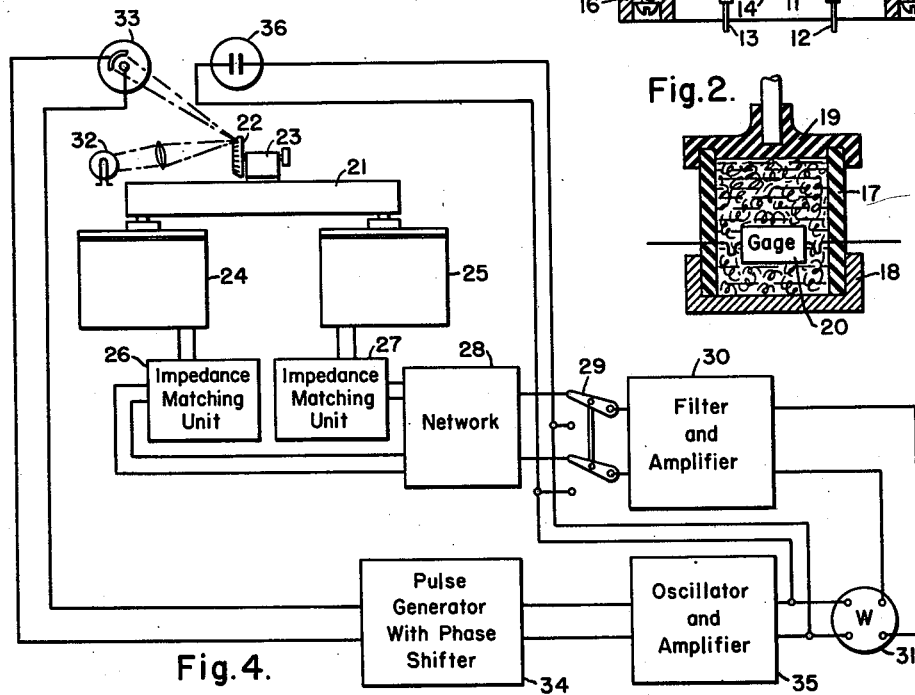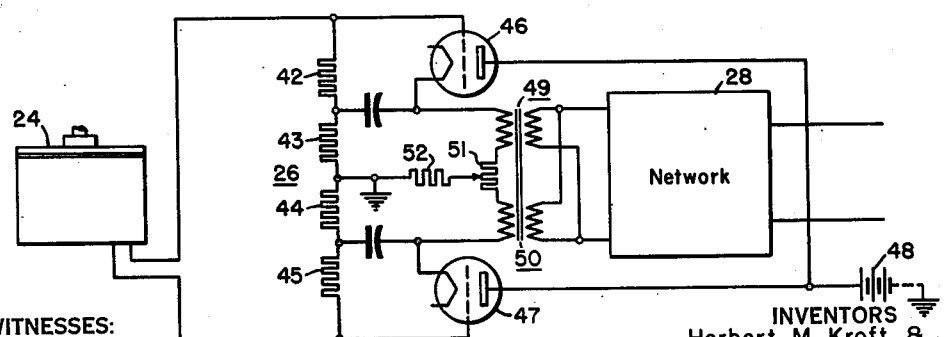

2,571,899

UNITED STATES PATENT OFFICE 2,571,899

VIBRATION PICKUP

Herbert M. Kroft, Baltimore, and Milton P. Vore, Catonsville, Md., assignors to Westinghouse Electric Corporation, East Pittsburgh, Pa., a corporation of Pennsylvania Application December 11, 1948, Serial No. 64,872

5 Claims. (Cl. 171—327)

My invention relates to vibration pickups for converting vibratory forces or movements into corresponding variations of an electric magnitude. In one of its more specific aspects, my invention relates to vibration pickups for determining the unbalance of rotors and is related to the invention of our copending application Serial No. 64,873, filed December 11, 1948, now U. S. Patent 2,534,918, entitled Method and Apparatus for Balancing Rotors, and assigned to the assignee of the present invention. However, the present invention is also applicable to pickups for other purposes such as the reproduction of recorded sound.

The known electric pickups have one or several of the following disadvantages. The pickups are sensitive not only to vibrations in the direction of interest but respond also to vibrations in other directions. Pickups of the electromagnetic type are sensitive to electromagnetic stray fields and hence of limited accuracy or hardly applicable for some purposes. In balancing or vibratory testing machines known pickups require such a mounting of the structure or rotor to be tested or also of the pickup itself that the vibratory motion is restricted to only one direction. Such special mountings require a relatively intricate structural design and are insufficient to prevent movements in unwanted directions if high vibratory frequencies, for instance, above 100 C. P. S. or 200 C. P. S., are involved. Known pickups and the appertaining mounting structure are also subject to disturbing resonance phenomena especially at the just-mentioned high vibration frequencies.

It is an object of my invention to provide a vibration pickup which avoids the above-mentioned disadvantages or minimizes them to an extent negligible within a much wider range of vibration frequencies than in the known pickups.

More particularly, it is an object of the invention to devise a pickup which permits being subjected to complex vibratory forces or movements in various directions, yet is electrically sensitive to one direction only, thus obviating the necessity for a special motion-restricting mounting and the difficulties and drawbacks due to such mounting.

Another more specific object of the invention is to provide a vibration pickup of a large frequency range up to frequencies above 100 or 200 C. P. S. which is not affected by magnetic stray fields.

Another object of the invention is to provide a vibration pickup capable of being also applicable as a supporting member for the structure or rotor to be tested so that it becomes unnecessary to provide a suspension or mounting for the test object other than that provided by one or several pickups.

According to the invention, I equip a pickup with a fluid-filled container which has a yieldable wall portion carrying a vibration transmitting rod or the like rigid member, and I dispose an electric pressure-responsive gauge within the fluid to produce changes of an electric quantity in response to the variations in fluid pressure caused by the transmitted vibrations. The pressure gauges are either of the voltage-generating type, such as piezo-electric or electrodynamic devices, or they consist of variable impedance devices such as capacitive, carbon type microphones or resistance strain gauges disposed in suitable compressible bellows or other compressible enclosures.

According to another feature of the invention, I dispose an electric crystal detector gauge in liquid enclosed by a partly rigid and partly yieldable enclosure.

These and other objects and features of my invention will be apparent from the following description in conjunction with the drawing, in which:

Figure 1 shows a cross-section through a vibration pickup designed in accordance with my invention;

Fig. 2 shows diagrammatically another embodiment of a pickup according to the invention; and Figs. 3, 4 and 5 illustrate one of the possible modes of application of a pickup according to the invention. More specifically, Fig. 3 shows a top view of the essential structure of a balancing machine; Fig. 4 shows a side view of the same structure in conjunction with the block diagram of a balance-measuring system; Fig. 5 shows the details of an impedance matching unit appertaining to the system of Fig. 4.

The pickup according to Figure 1 has a heavy-walled and rigid container 1 which is substantially cup-shaped and is covered by a diaphragm 2 of soft or yielding material such as rubber or plastic. The diaphragm 2 is tightly pressed onto the container 1 by means of a pressure ring 3 which is attached to the container 1 by means of fastening screws. Mounted on the diaphragm 2 is a metal member 4 which is non-resonant through the intended frequency operating range. A rod 5 secured to member 4 serves to impart the vibrations to the diaphragm 2. The member 4 may be bonded to the top side of the diaphragm 2 so that it is unnecessary to perforate the diaphragm; or the diaphragm with attachment may consist of a moulded unit and additional gaskets may be provided for tightening purposes.

The chamber enclosed by the container 1 and the appertaining diaphragm 2 is filled with an insulating fluid 6, preferably liquid, which is chemically inert with respect to the metal, diaphragm and other surfaces contacted by the fluid. For instance, silicone fluid, castor oil or refined kerosene are suitable. The wall of container 1 has a bore closed by a screw 7 through which the liquid 6 may be introduced into the container. The container and liquid should be outgassed before and during the filling process so that no air bubbles are included in the chamber.

Mounted in the chamber is a positioning block or pads 8 of rubber or other insualting material. Disposed in the cavity of block 8 is a pressure-responsive gauge consisting of a crystal element 9. Such crystal gauges are known as such and I prefer using for the purpose of my invention, the available type of element that is composed of a stack of flat crystals which are disposed between electrodes such as those denoted by 10 and 11. Such stacks of lithium sulfate crystals have been used for submarine sound detection. Attached to the electrodes are conductors 12 and 13 which are let out of the container through pressure-tight and insulating bushings. The space between the crystal gauge and the walls of the positioning block 8 is preferably filled with an insulating padding 14 of a material permeable or porous to the insulating liquid. The padding material may consist of spun glass. The crystal gauge 9 is held in position by means of a spring 15 which need exert only the slight pressure required for preventing excessive movements of the crystal gauge relative to the positioning block or container. The exterior ends of the insulating bushings for leads 12 and 13 and any contact terminals of the pickup to which the leads may be attached, are protected by a ring 16 which is screwed to the bottom of the container 1.

Due to the resiliency of the diaphragm portion of the container, the metal member 4 and the transmission rod 5 are capable of limited universal movement relative to the rigid portion 1 of the container. In particular, the member 4 and rod 5 may perform movements in any direction within the plane of the diaphragm, or the movements may have components in a direction perpendicular to the membrane. Only the last-mentioned components of movement are effective to vary the fluid pressure of the liquid 6. Consequently, the voltage variations of the crystal gauge in response to variations in liquid pressure are determined only by such perpendicular vibration components. Since the pressure of the liquid is the same at any place within the chamber, the position of the crystal gauge within the chamber is not critical. Consequently, the arrangement and positioning of the crystal gauge may be varied. For instance, the chamber may be completely filled with insulating porous padding material and the spring 15 or the positioning block 8, or both, may then be omitted.

In order to prevent fluid flow or turbulence within the container, its interior may be equipped with baffles. As a matter of fact, if the interior is largely filled with spun glass or the like distributed material, such material represents also an effective baffle means and prevents disturbances due to flow phenomena. Preferably, the baffle material should be porous; relatively non-compressible, and non-resonant over a wide range of frequencies; and these requirements are all met by the mentioned use of spun glass.

While the embodiment of Fig. 1 contains a crystal gauge, it should be understood that other types of electric pressure gauges may be used instead. Such other gauges, for instance, may comprise a magnet and coil enclosed in a bellows to produce voltage variations in response to changes in pressure imposed on the bellows, or gauges of the variable impedance type, such as a carbon microphone, capacitive device, or strain gauge in suitable enclosures or holders are applicable. Pressure gauges of these various types are well known as such and hence not illustrated. Preferable for many purposes are non-magnetic gauges because they do not respond to magnetic stray fields. The container structure that encloses the gauge within a confined quantity of gaseous or liquid fluid may also be given various designs other than the one described above with reference to Fig. 1. For instance, the gauge and fluid may be housed in a piece of rubber, plastic, or in a yieldable hose or tubing whose ends are plugged or capped. An example of such a design is illustrated in Fig. 2.

According to Fig. 2, a piece 17 of yieldable tubing has one end sealed by a rigid cap 18. The other end is closed by a molded yieldable cover piece 19 which is tightly joined or moulded to the tubing 17 and has a reenforced center portion which carries the vibration-transmitting rod. An electric pressure gauge 20 of any of the above-mentioned types is disposed within the container structure and held in place by spun glass or the like permeable material. The tubing is filled with fluid, preferably a chemically inert liquid. The device of Fig. 2 operates substantially in the same manner as that of Fig. 1.

Vibration pickups according to the invention can be used for various kinds of vibration and unbalance tests. For instance, in devices for testing rotors for unbalance, the rotor bearings may be directly mounted on the diaphragms or appertaining metal members (4 in Fig. 1) of two pickup units which are placed in their proper alignment position. In such an arrangement, each pickup according to the invention represents not only a vibration gauge but also part of the vibratory supporting structure for the rotor to be balanced.

A vibration study of the phase angle of motion in an assembly is also readily accomplished through the use of two pickups according to the invention. The time conditions of the vibratory motion in a single direction can be registered. For example, one pickup unit can be used to determine horizontal motion and another pickup unit for determining vertical vibration. The units, due to heir ability to give phase-angle conditions, lend themselves readily to the study of problems of "oil whip" and "shaft whirl" in rotating equipment. In the applications mentioned so far, the pickup voltages are substantially proportional to the vibratory force variations transmitted to them. However, it is also possible to apply the pickups in such a manner that they respond to the acceleration of the vibrations responded to. For instance, if the pickups are not rigidly supported on a base, but are permitted to move freely in space by either mounting them on soft springs or by letting them hang form the body whose vibration is to be measured, the outputs of the crystal gauges are a function of the acceleration of the vibrating body.

In order to more completely present an example of one of the modes of application for pickups according to the invention, a method and apparatus for the dynamic balancing of rotors will be described presently with reference to Figs. 3, 4 and 5.

According to Figs. 3 and 4, a rotor 22 is mounted on the shaft of an electric motor 23, such as is the case with available gyroscope units. In order to test the rotor for unbalance, the unit is firmly secured to a supporting bar 21 which in turn is mounted on the transmission rods of two pickup units 24 and 25 each or which may correspond to the design illustrated in Fig. 1. The two pickup units 24 and 25 are spaced from each other along the axis of revolution of the rotor 22 so that their respective crystal gauges respond to vertical vibrations of the rotor in two different transverse planes. The output leads of the two pickups are connected through respective impedance matching units 26 and 27 to a network 28 whose output circuit is connected through a switch 29 to a filter and amplifier unit 30. The filter of this unit has a narrow pass band at the frequency at which the rotor 22 is to revolve. The output voltage of the unit 30 corresponds in phase and magnitude to the output voltage of the pickup 24 or 25 depending upon the position of a selector switch (not shown) in network 28. The output circuit of unit 30 is connected to the voltage coil of an indicating wattmeter 31.

The current coil of the same wattmeter is supplied with a sinusoidal voltage synchronized with the revolving rotor and of a fixed amplitude and known phase condition. This sinusoidal reference voltage is produced by a generator of the photoelectric type. More in detail, a reflecting spot is provided at the surface of the rotor 22. A source of light 32 and a phototube 33 are positioned relative to each other and relative to the rotor surface that the bright spot passes once through the focal reflecting point of the light beam during each revolution of the rotor 22. In this manner, the phototube 33 is caused to supply during each revolution a single impulse at the moment when the rotor passes through a given angular position. This impulse is applied to a unit 34 which includes an electronic pulse generator and a phase shifter. The output of unit 34 is applied to an electronic unit 35, which includes an oscillator, amplifier and attenuator. The output voltage of unit 35 is impressed on the wattmeter. This voltage is due to the attenuating function of unit 35 of a constant amplitude, and its phase position relative to the revolution of the rotor 22 depends upon the adjustment of the phase shifter in unit 34 and can be changed to any desired angular value.

The individual electronic units or sections shown in block fashion in Fig. 4 are known as such, and hence require no detailed description. For instance, the network denoted by 28 may be designed in accordance with the corresponding disclosure in Patent No. 2,165,024 of Baker and Rushing, assigned to the assignee of the present invention. The other electronic units may be designed for instance in accordance with the corresponding disclosure in the copending application Serial No. 613,764, filed August 31, 1945, by M. A. Treuhaft, now abandoned, which is also assigned to the assignee of the present invention. One of the applicable designs of an impedance matching unit, denoted by 26 and 27 in Fig. 4, is illustrated in Fig. 5.

According to Fig. 5, the pickup unit 24 is connected across a voltage divider whose resistance sections are denoted by 42, 43, 44 and 45. Attached to the voltage divider are two matching vacuum tubes 46 and 47 whose plate circuits are energized from a suitable direct-current source 48 of constant voltage, and extend through transformed windings 49 and 50 on a single core to a balancing resistor 51 whose slider is connected through a resistor 52 to the midpoint of the voltage divider and to the negative terminal (ground) of the plate voltage source. The secondary circuit of the windings 49 and 50 is connected to the input terminals of the network 28. The impedance of the voltage divider circuit attached to the pickup has an order of magnitude adapted to that of the pickup, while the impedance in the secondary transformer circuits corresponds to that desirable as an input impedance for network 28.

The balancing apparatus according to Figs. 3 to 5 can be operated in the following manner.

In order to determine the angular location of the unbalance of rotor 22, the switch 29 is first positioned to connect the output of the oscillator unit 35 to the filter and amplifier unit 30. Thereafter, the tuning control of unit 34 is changed by the operator until the wattmeter 31 reads zero. Under these conditions, the current in the voltage coil is 90° out of phase with the current in the current coil. Then the switch 29 is positioned to connect the output of network 28 to the filter and amplifier unit 30, and the phase shifter of unit 34 is readjusted by the operator until the deflection of the wattmeter 7 is again zero. At this time, the voltage wave from unit 35 is 90° out of phase with the voltage wave generated at the output terminals of network 28. The stroboscopic glow lamp 36 flashes at the moment when the voltage wave from unit 35 passes through the zero value while changing from negative to positive polarity. Consequently, the lamp 36 illuminates the rotor 22 at the precise instant at which the rotor has an angular position indicative of that of the unbalance.

While the above-described example of balancing apparatus represents only one of many available uses for pickups according to the invention, it demonstrates several essential advantages of such pickups.

In the first place, it will be recognized that such pickups do not require a separate mounting for the vibratory body to be tested nor any other design for restricting the vibrating body to movements within a single plane or direction. This is due to the fact that the pickup can be subjected to vibrations in various directions but is inherently selective to respond only to vibration components of a single direction. It will further be recognized that pickups according to the invention can be used also as part of the supporting structure for the vibrating body to be tested. Consequently, such pickups permit a very considerable simplification of the design in balancing and other testing equipment.

We claim as our invention:

1. A vibration pickup, comprising a container filled with fluid and having a rigid wall portion and a yieldable wall portion, a rigid transmitting member mounted on said wall portion for transmitting vibration thereto, said member having with said yieldable wall portion a function of smaller area than said yieldable wall portion so as to be capable of translatory and angular movement relative to said rigid wall portion, and a pressure-responsive electric crystal gauge disposed in said container and within said fluid to be subject to fluid pressure variations caused by said vibrations.

2. A vibration pickup, comprising a container having a cup-shaped rigid portion and a yieldable cover portion and being filled with fluid, a vibration transmitting rod mounted on said cover portion to be capable of limited universal movement relative to said rigid portion, and an electric crystal detector gauge disposed in said container and within said fluid to be responsive to variations in fluid pressure.

3. A vibration pickup according to claim 1, comprising an insulating rigid body within said container and secured to said rigid portion, said body having a cavity, said gauge being loosely disposed in said cavity so as to leave an interstice around said gauge, and resilient insulating material permeable by said liquid and disposed in said interstice and extending substantially completely through said interstice.

4. A vibration pickup, comprising a container having a rigid main portion and a yieldable cover portion and being filled with liquid, a vibration transmitting rigid mechanical member mounted on said cover portion to be capable of limited universal movement relative to said rigid portion, a pressure-responsive electric gauge disposed in said container to be subject to variations in liquid pressure, two insulated and pressure-tight inleads extending from without through said main portion and being connected to said gauge, and a resilient mass permeable by said liquid and composed of subdivided material, said mass being disposed within said container and filling substantially the entire interstice around said gauge so as to brace said gauge against said container main portion.

5. A vibration pickup, comprising a container filled with liquid and having a yieldable wall portion, a vibration-transmitting rigid member mounted on said wall portion, an electric pressure gauge disposed in said liquid, and a mass of spun glass disposed in said liquid around said gauge.

HERBERT M. KROFT.
MILTON P. VORE.

REFERENCES CITED

The following references are of record in the file of this patent:

UNITED STATES PATENTS

| Number | Name | Date |
| --- | --- | --- |
| 1,599,922 | Rathbone | Sept. 14, 1926 |
| 1,619,125 | Hough | Mar. 1, 1927 |
| 1,919,480 | Rieber | July 25, 1933 |
| 2,207,539 | Gravley | July 9, 1940 |
| 2,415,832 | Mason | Feb. 18, 1947 |
| 2,416,314 | Harrison | Feb. 25, 1947 |
| 2,434,648 | Goodale et al. | Jan. 20, 1948 |
| 2,497,680 | Massa | Feb. 14, 1950 |